(12) United States Patent
Zoppas

(10) Patent No.: US 7,425,124 B2
(45) Date of Patent: Sep. 16, 2008

(54) DEVICE AND METHOD FOR COMPRESSION MOULDING OF PLASTIC ARTICLES

(75) Inventor: Matteo Zoppas, Fontanafredda (IT)

(73) Assignee: S.I.P.A. Societa Industrializzazione Progettazione Automazione S.p.A., Vittorio Veneto (IT)

(*) Notice: Subject to any disclaimer, the term of this patent is extended or adjusted under 35 U.S.C. 154(b) by 0 days.

(21) Appl. No.: 10/497,843

(22) PCT Filed: Dec. 5, 2002

(86) PCT No.: PCT/EP02/13763

§ 371 (c)(1),
(2), (4) Date: Jun. 7, 2004

(87) PCT Pub. No.: WO03/047834

PCT Pub. Date: Jun. 12, 2003

(65) Prior Publication Data
US 2005/0031723 A1 Feb. 10, 2005

(30) Foreign Application Priority Data
Dec. 7, 2001 (IT) .......................... RM2001A0723

(51) Int. Cl.
B29C 43/08 (2006.01)
B30B 15/30 (2006.01)
B29C 31/06 (2006.01)
B29C 33/02 (2006.01)

(52) U.S. Cl. .................. 425/348 R; 425/345; 425/353; 264/297.6

(58) Field of Classification Search .................. 65/266, 65/297, 64, 76, 222, 223, 224; 425/348, 425/348 R, 345, 376, 349, 350, 352, 344, 425/804, 353, 348 S; 264/297.6
See application file for complete search history.

(56) References Cited

U.S. PATENT DOCUMENTS

| | | | | |
|---|---|---|---|---|
| 1,601,836 A | * | 10/1926 | Stenhouse | 65/231 |
| 1,845,525 A | * | 2/1932 | Sloan | 65/221 |
| 2,383,349 A | * | 8/1945 | Slick | 65/223 |
| 2,621,363 A | | 12/1952 | Fienberg et al. | |
| 3,375,553 A | * | 4/1968 | Criss | 425/587 |
| 3,849,041 A | * | 11/1974 | Knapp | 425/110 |
| 5,211,798 A | | 5/1993 | Keller | |
| 5,672,364 A | * | 9/1997 | Kato et al. | 425/89 |
| 5,807,592 A | | 9/1998 | Alieri | |
| 5,811,044 A | | 9/1998 | Rote | |
| 6,123,880 A | | 9/2000 | Ingram | |

* cited by examiner

Primary Examiner—Matthew J. Daniels
(74) Attorney, Agent, or Firm—Simpson & Simpson, PLLC

(57) ABSTRACT

A device for compression moulding of plastic objects, comprising a plurality of compression-moulding units (9), each of which comprises a core mould element and a moulding cavity (2) filled by dropping into it a dose of plastic material; each moulding unit (9) is designed to carry out a moulding sequence comprising an operation of opening of the mould, an operation of filling of the moulding cavity, and an operation of closing of the mould. The device further comprises cam mechanisms for taking the moulding cavity outside of the vertical axes of the positive-mould element between the operation of opening of the mould and the operation of filling of the moulding cavity.

The invention further relates to a method for the production of plastic objects by means of compression moulding device as described above.

8 Claims, 4 Drawing Sheets

DEVICE AND METHOD FOR COMPRESSION MOULDING OF PLASTIC ARTICLES

CROSS REFERENCE TO RELATED APPLICATIONS

This application claims the benefit to International Application PCT/EP02/13763, filed 12 Dec. 2002 (English), which claims priority from Italian Application RM2001A000723, filed 7 Dec. 2001.

FIELD OF THE INVENTION

The present invention relates to a device and method for compression moulding of objects made of plastic material, the said device and method being applicable, with particular advantages, to the moulding of parisons to be used for the production, by blow moulding, of bottles, jars and containers in general.

STATE OF THE ART

From the state of the art, there are known various devices and methods for compression moulding of objects made of plastic materials, in particular, continuous-cycle compression-moulding presses, in which a dispensing device, which may be one of various types, fills the various moulding cavities by dropping a small mass or dose of fluid plastic material to be moulded.

Parisons for the production of blow-moulded containers, in particular, ones made of PET, are commonly produced by injection moulding, or else by extrusion. Injection-moulding machines, in general, operate in a sequential way, i.e., a step is envisaged of filling different moulding cavities of one and the same mould with fluid plastic material, followed by a step of cooling, and a step of opening of the mould and extraction of the entire batch or lot of parisons.

In the machines that are commonly referred to as continuous machines, the different steps of filling of the mould, cooling, and extraction of the moulded pieces take place simultaneously and, according to a continuous cycle, in different parts of the plant. A particular type of continuous machines are the "rotary" machines, where the movement of the moulds through the steps of filling, closing and re-opening takes place on one or more turntables, which generally have a vertical axis.

Application of the aforementioned continuous compression-moulding devices for the production, in particular, of parisons would potentially present the following advantages over sequential injection-moulding presses:

lower moulding temperatures and pressures, and hence a lower rate of residual acetaldehyde in the finished bottle. Acetaldehyde is a cause of an unpleasant taste of apple, for example in mineral water bottles kept in warehouses where temperatures are high over long periods of time;
  absence, on the finished parison, of the defectiveness of the point of injection, which is a cause of poor quality and of bursting of the bottles in the subsequent blowing operation;
  possibility of moulding parisons with fewer limitations on the type and quality of the PET used;
  easier connection of the moulding station with the rest of the plant, which generally comprises, for the most part, continuously operating machines, and no need for stocking units;
  filling with more uniform doses and at more uniform temperatures of the various moulding cavities, and reduction of the dimensions of the moulds (results which are more difficult to obtain in moulds with a large number of moulding cavities), which are frequently adopted with sequential presses to meet the needs of high production rates entailed in the moulding of parisons;
  better thermal insulation between the "hot part" (area of plastication of the material to be moulded) of the machine and the "cold part" (area of cooling of the moulds), thanks to filling of the moulds "by dropping".

The continuous compression-moulding machines so far built prove unsatisfactory because they are incapable of high production rates and present a complicated mechanics, and in certain cases, do not provide a satisfactory solution to the considerable thermal problems deriving from the poor thermal insulation between the "hot areas" and "cold areas" of the machine.

The above problems, as well as problems arising in other cases, as for example the moulding of plastic materials such as PET, or else for the moulding of plastic objects of rather small size, would frequently push manufacturers to resort to large-sized devices for filling moulds "by dropping". Such devices enable faster filling rates, greater precision in dosing, and the possibility of carrying out filling even with plastic materials having a particular tendency to stick to the contact surfaces and to form strings such as, for example, PET.

However, currently known compression-moulding carousels impose the need to use dosing devices of small dimensions, with consequent limitations on the performance of the plant.

The purpose of the present invention is to provide a device and method for filling moulds for compression moulding, which overcome the drawbacks of the prior art described above, in particular, providing a compression-moulding device which will enable the use of dosing and filling stations with less stringent requirements in terms of overall dimensions as compared to the prior art.

According to a first aspect of the present invention, the above problems are solved by a device for compression moulding of plastic objects, comprising one or more compression-moulding units, each of which includes a respective positive-mould element and a moulding cavity that is designed to be filled by dropping therein a dose of plastic material, where each of said moulding units is designed to carry out moulding sequences, which include an operation of raising the positive-mould element, an operation of filling the moulding cavity, and an operation of lowering the positive-mould element and closing the mould, and is characterised in that it further comprises means for fixing and moving the positive-mould element and/or the moulding cavity, the said means being designed to bring said cavity outside the vertical axes of the positive-mould element between the operation of opening of the mould and the operation of filling of the moulding cavity.

According to a further aspect of the present invention, the problems described above are solved by a method for the production of plastic objects by means of compression moulding using a device as described above, characterised in that it comprises the following steps:

opening each moulding unit, moving away the female or negative half-mould and the respective positive-mould element by means of a vertical displacement;
  bringing the moulding cavity of each negative half-mould into a position outside the vertical axis of the respective positive-mould element;
  dropping a dose of plastic material to be moulded into each moulding cavity;
  bringing the negative half-mould back underneath the corresponding positive or male-mould element; and closing the positive-mould element and the negative half-mould together.

The fact that the aforesaid cavity is brought outside of the vertical axes of the positive-mould element, which functions as positive half-mould for the mould, between the operation of opening of the mould and the operation of filling of the moulding cavity, enables filling devices having fewer dimensional constraints to be used—in particular, filling devices of larger dimensions in the direction of the height and possibly in the diameters—, it no longer being necessary to introduce mechanical members in between the two opened and superposed half-moulds for depositing the doses of plastic material in the cavities of the negative half-mould. Filling may be performed in a filling station that is in all cases external to the compression station, simply by positioning the negative half-mould with the cavity to be filled underneath the filling station, at the point where the latter drops the doses. This fact also enables a reduction in the closing and opening stroke of the moulds, so speeding up the moulding cycle.

In general, the possibility of using filling devices of larger dimensions means that it is possible to benefit from the various advantages referred to above, in particular a higher rate of filling, the possibility of dosing the plastic material in a precise way and in substantial doses, and the possibility of working plastic materials that are critical for various reasons (for example, PET which, for the reasons mentioned above, involves the adoption of more complex filling stations).

In the case where the moulding units are mounted and displaced on a rotary carousel, advantageously the fixing means and the moving means are designed to bring the moulding cavities outside the vertical axes of the positive-mould element, displacing them towards the outside of the carousel. This enables use of a filling station that is external to the carousel and hence can be of larger dimensions.

LIST OF FIGURES

Further advantages that can be achieved with the present invention will become more apparent to the person skilled in the art from the ensuing detailed description of an embodiment described by way of non-limiting example, with reference to the attached figures, in which.

DETAILED DESCRIPTION

Figure 1:
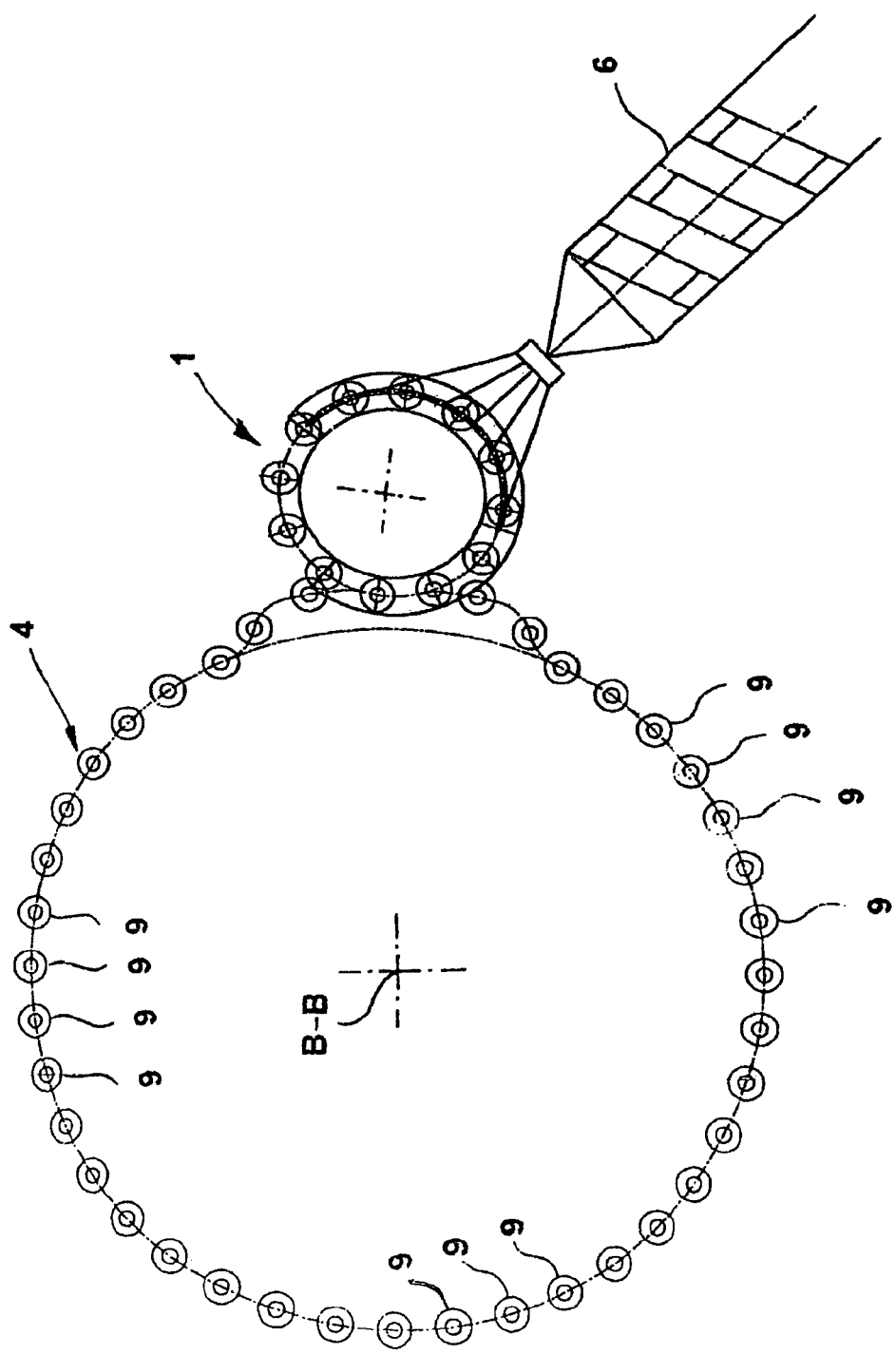
FIG. 1 is a schematic top plan view of a preferred embodiment of a compression-moulding plant according to the present invention.

FIGS. 1 to 4 are schematic illustrations of a preferred example of embodiment of a device for the production of plastic objects moulded by means of compression moulding according to the invention, which comprises a filling station, designated globally by numeral 1, and a compression station, designated globally by 4. The filling station 1 is a purposely designed device capable of dropping a pre-set dose of plastic material to be moulded into the moulding cavity 2 of a negative half-mould 3. The filling device 1 of FIGS. 1 and 2 comprises a rotating carousel (or filling carousel), which, rotating about a vertical axis A-A, in an area 5, continuously picks up dosed amounts of extruded plastic material from a plastication screw 6, for instance, within variable-volume dosing chambers 7, which are arranged in the proximity of the outer edge of the filling carousel, and carries them into a discharge area 8, where it drops them into the moulding cavity 2 (FIG. 3) of a negative or female half-mould 3, causing them to come out through an opening (not shown) of each dosing chamber 7. In the example illustrated, the openings of the various variable-volume chambers 7 move along a circular path C'.

The compression station 4, according to a preferred embodiment, comprises a second rotating carousel, also referred to as compression carousel, which can turn about a second vertical axis B-B, different from the axis A-A and on which there are mounted a number of moulding units 9, each of which comprises one or more elements defined core moulds or male or positive-mould elements 208, (not shown) and the corresponding negative half-moulds 3 (see FIGS. 3 and 4), the former being mounted on top of the latter.

Each moulding unit is designed to carry out moulding cycles which comprise an operation of opening the mould, an operation of filling the moulding cavity 2 with a small mass of fluid plastic material, and an operation of closing and cooling the mould. Appropriate fixing and moving means enable opening and closing of each moulding unit by lowering and raising each positive-mould element or half-mould (not illustrated in the Figures) on the corresponding negative half-mould with a vertical rectilinear travel or stroke.

Figure 2:
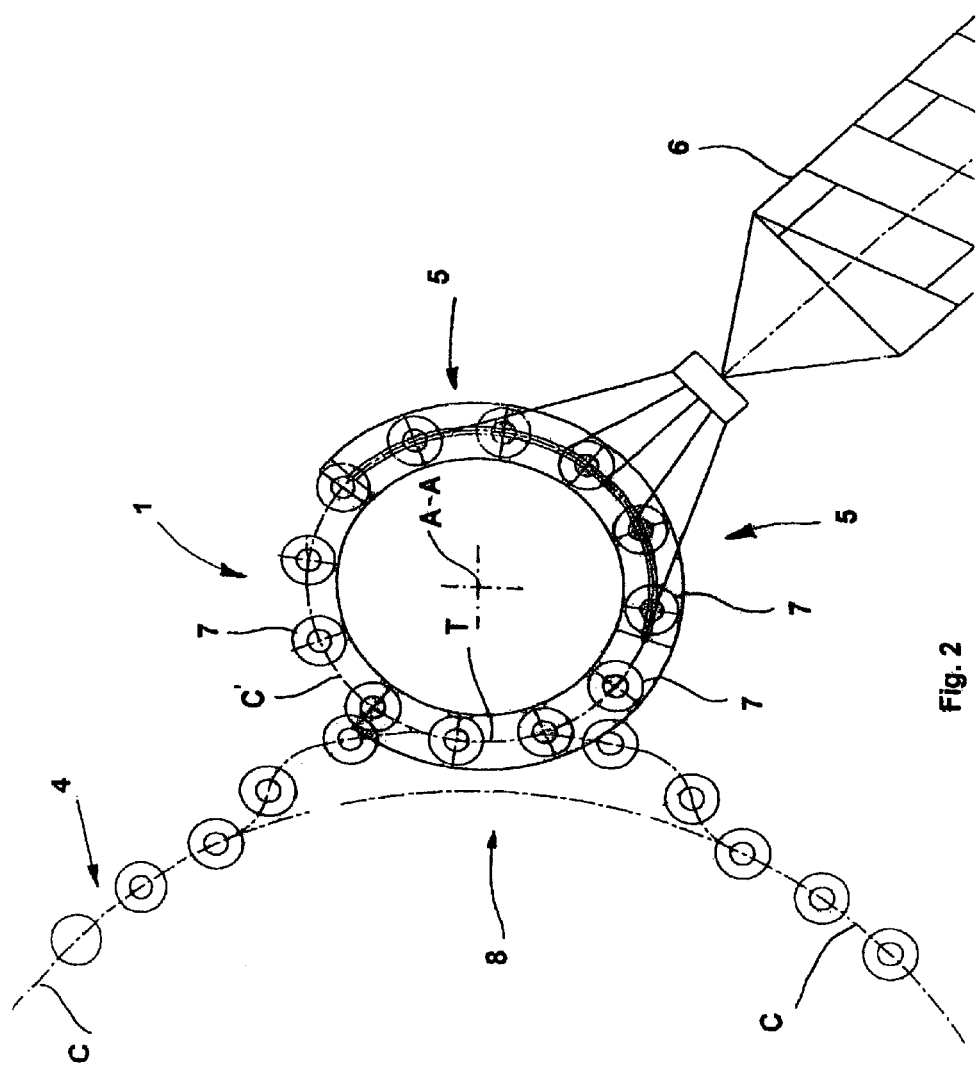
FIG. 2 is a plan view of a detail of the plant of FIG. 1.

In the example illustrated in FIGS. 1 and 2, during operation, the compression carousel 4 turns in a counterclockwise direction, whilst the filling carousel 1 turns in a clockwise direction, and the two rotations can be combined with a system of gears or with an electrically driven shaft system.

With a continuous operation, during rotation of the carousels 1 and 4, one or more moulding units 9 are filled by the filling carousel, which drops a dose of fluid plastic material, in the form of a rounded mass or small ball, into the corresponding moulding cavities. Simultaneously, in other moulding units 9, which have already been filled, the plastic material is cooled with the mould closed, whilst yet other moulding units 9 are opened for extraction of the plastic objects, which are by now in a sufficiently solidified state, for discharge thereof from the moulding station 4, and for sending them on to processing stations set downstream. In the present particular example, the objects to be moulded are parisons made of polyethylene terephthalate (PET), which are to be used for the production, by blow moulding, of bottles for foodstuffs, jam jars, or other types of containers.

According to one aspect of the present invention, the fixing and moving means are designed to bring the moulding cavity 2 of each negative half-mould, after the operation of opening of the mould and before the operation of filling a moulding cavity within a moulding cycle, into a position outside of the vertical axes of the positive-mould element, where by the expression "position outside of the vertical axes of the positive-mould element" is meant a position in which the vertical of no point of the positive-mould element or core mould falls on the moulding cavity. In determining the said position, account will also be taken of the dimensions of the parts of the moulding station adjacent to the positive-mould element, for example, the dimensions of any possible mould-holder plates and of the slide on which the positive-mould element is fixed, of any possible actuating cylinders, etc., and of the dimensions of the parts of the filling station 1 that come closest to the moulding cavity 2 that is to be filled, however, in such a way as to enable the filling station 1 to drop a dose of plastic material into the moulding cavity 2, set in the position described above, even though said dimensions vary according to the specific design of the two stations.

Figure 3:
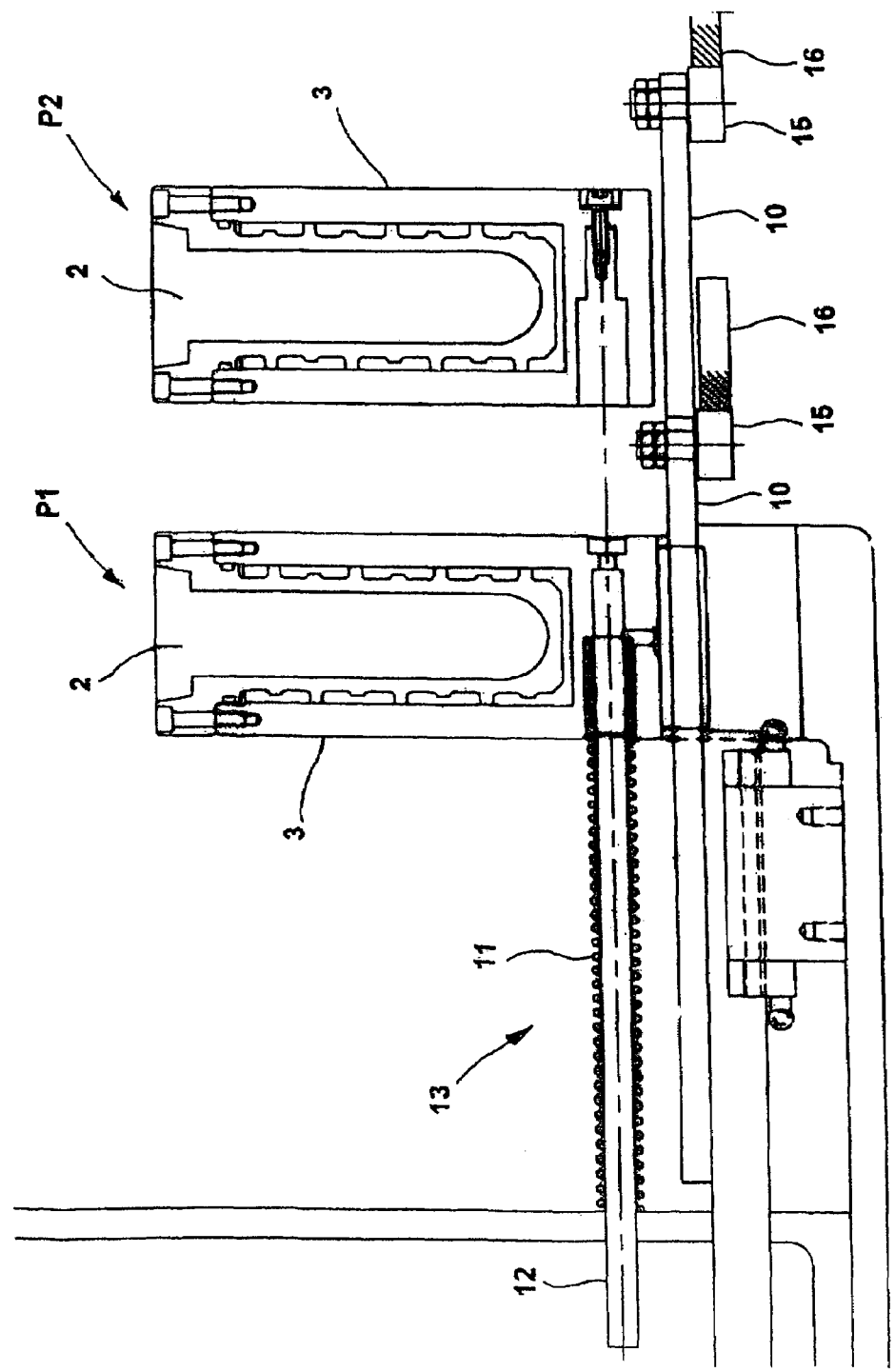
FIG. 3 is a partially sectioned schematic side view of the fixing and moving device of a negative half-mould of the plant illustrated in FIG. 1.
Figure 4:
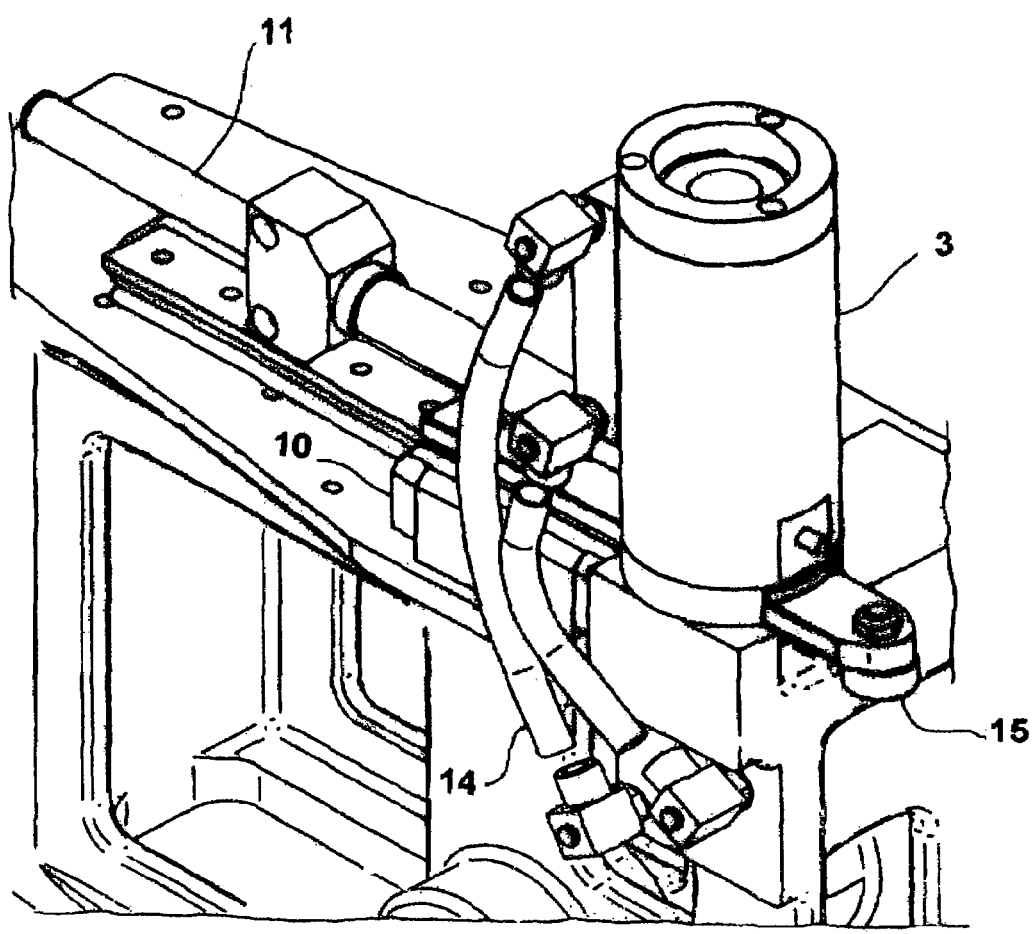
FIG. 4 is a schematic three-dimensional view of the device of FIG. 3.

Preferably, the means for fixing and moving each negative half-mould 3 comprise a cam-actuating mechanism 13, an example of which is represented in FIGS. 3 and 4. Each negative half-mould 3 is mounted on a slide 10, which is designed to slide horizontally in a radial direction with respect to the moulding carousel 4 and the axis of rotation B-B. The slide 10 is constantly pushed towards the outside of the carousel by a compression spring 11 guided by the sliding rod 12. FIG. 3 shows the slide 10 in two different positions, P1 and P2. In position P1 (where the slide 10 is closer to the axis B-B) the negative half-mould 3 is positioned underneath the male element in a position such as to enable lowering of the latter and closing of the mould, whereas in position P2 (where the slide 10 is further away from the axis B-B), the negative half-mould is underneath the filling and dosing station 1 in a position such that it is able to receive a dose of fluid plastic material dropped from the station 1 itself.

FIG. 4 is a three-dimensional view of the cam device 13. The flexible hoses 14 enable the half-moulds to be kept connected to the cooling circuit during the entire moulding cycle.

FIG. 2 is a schematic top-plan view of the path of the negative half-moulds along the cam. Appropriate mechanical grips block the slide with respect to the compression carousel 4 at a fixed distance from the axis of rotation B and thus keep it immobilised throughout the steps of compression, cooling, re-opening of the mould, and extraction of the parison. During these steps, each mould consequently moves along the circular path C. As the mechanical grips are released, each compression spring 11 carries the wheel 15 into a position where it bears upon the profile of the cam 16 and, whilst the compression carousel proceeds in its rotation about the axis B, each negative half-mould 3 is deviated by the circular path C and is pushed outside said path by the cam-actuating mechanism 13, so as to position itself underneath the filling station 1 for being filled.

Advantageously, the path of the cam 13 is such as to keep each moulding cavity 2 to be filled and the aperture of the variable-volume chamber 7 set on top of one another following a sufficiently long stretch T of the path C' astride of the point of release of the dose from the opening of the variable-volume chamber. This enables the doses of plastic material dropped by the dispenser 1 to fall into the cavities 2 with a smaller degree of error, and consequently enables faster rates of rotation of the two carousels 1 and 4. The path of the cam 13 will clearly take into account the effects of the centrifugal forces that have upon the paths of the doses of plastic material as it is dropped, and also the path C' of the dosing chambers may be not only circular but also assume other forms so as to facilitate depositing of the doses in the moulding cavities by dropping.

Next, whilst the compression carousel proceeds in its rotation, the negative half-moulds 3 that have been filled are made to pass again beneath the respective positive half-moulds by the profile of the cam 16 and are then clamped by the mechanical grips in a fixed position on the compression carousel, resuming their progress along the circular path C.

Each moulding unit 9 hence performs a new sequence of closing of the mould, cooling of the plastic material, opening of the mould, and extraction of the solidified moulded piece, followed by expulsion of the piece in the direction of the processing stations set downstream of the station described here.

Once the parisons have been discharged from the compression station, they can, for example, be loaded onto a continuous chain conveyor or equivalent piece of equipment, which sends them on to a blowing machine, which is advantageously a continuous-cycle machine, or else to a generic processing station set downstream in the production process.

For the production of parisons that are not to undergo blow moulding immediately, but are stored before undergoing blow moulding at a later date (e.g., days or months later), advantageously the parisons are unloaded from the compression stations illustrated in FIGS. 1 and 2 at an appropriate temperature, and their cooling is completed in a cooling station set downstream, which can be made at lower costs than the compression station. In this way, the compression station can operate at higher production rates or, in other words, an ensemble made up of a compression station and a cooling station can be provided at initial costs that are lower than the costs for a single compression station having an equal output rate.

The displacement of each negative half-mould 3 outwards enables use of filling and dosing stations even of large dimensions both as regards their height and, in the case of rotating-carousel filling stations 1, as regards the diameter of the carousel itself. This fact also enables an increase in the production rate of the dosing station, as well as enabling installation on the dosing station of the devices necessary for dispensing plastic materials that are difficult to handle, such as, for example, PET—which tends to form strings by sticking to the walls with which it comes into contact—, as well as filling with considerable doses of plastic, etc.

Advantageously, the moulds of the various moulding units have just one moulding cavity 2, and each moulding unit actuates and moves a single mould independently of the other half-moulds. This enables a uniform rotation of the compression carousel and reduces mechanical sizing of the cam device 13, since the various negative half-moulds are small and light. Furthermore, there is a reduction in the vibrations and stresses due to any impact occurring during radial displacement of the half-moulds 3, and this displacement may be performed at a faster rate.

The example of embodiment described above may undergo various modifications. Clearly, it may be applied to the moulding of objects that are not necessarily parisons for blow moulding of bottles made of plastic materials. The filling station 1 may be a sequentially operating one, instead of a continuously operating one. The negative half-moulds 3 may have more than one moulding cavity 2. The half-moulds in the compression stations 9 may be moved not only by turntables along circular paths but, more generally, on systems for moving of various types, such as, for example, lines for movement on pallets and along closed paths of varying geometrical shape. The moulds may be opened and closed with strokes that are other than vertical, and the moulding cavities 2 can be displaced outside the vertical axes of the positive half-mould with a movement that is not only orthogonal but, more in general, transverse to the opening and closing strokes of the moulds. The process described above may be applied to the moulding not only of objects made of PET, but also of objects made of other plastic materials, amongst which, for example, PS, PE, PP, PVC, PEN and PBT.

The invention claimed is:

1. A device for compression moulding plastic objects comprising:
   a plurality of compression-moulding units, each of said compression-moulding units comprising a moulding cavity, a positive moulding element operatively arranged to engage said moulding cavity, and a means for axially aligning and axially displacing said moulding cavity with respect to said positive moulding element;
   a first carousel rotating about a first axis comprising a dosing chamber positioned about said first carousel and rotating about said first axis along a first circular path, said dosing chamber operatively arranged to discharge a dose of plastic material into said moulding cavity;

a second carousel rotating about a second axis, said compression-moulding units positioned about said second carousel and said second axis spaced from said first axis, said means for axially aligning and axially displacing said moulding cavity is operatively arranged to axially position said moulding cavity underneath said dosing chamber along at least a portion of said first circular path; and, a dosing device positioned proximate said first carousel and arranged to fill said dosing chamber with said dose of plastic material by means of a plastication screw.

2. The device according to claim 1, said means for axially aligning and axially displacing said moulding cavity comprising a cam-actuating mechanism.

3. The device according to claim 2, said cam-actuating mechanism adapted to displace each moulding cavity outside the vertical axis of the positive-mould element by means of a movement that is independent of the other moulding cavities.

4. The device according to claim 1, said dosing chamber being a variable volume dosing chamber.

5. The device according to claim 1, further comprising a means for actively cooling said plurality of compression-moulding units.

6. A device for compression moulding plastic objects comprising:

a plurality of compression-moulding units, each of said compression-moulding units comprising a moulding cavity, a positive moulding element operatively arranged to engage said moulding cavity, and a means for axially aligning and axially displacing said moulding cavity with respect to said positive moulding element;

a first carousel rotating about a first axis comprising a dosing chamber positioned about said first carousel and rotating about said first axis along a first circular path, said dosing chamber operatively arranged to discharge a dose of plastic material into said moulding cavity;

a second carousel rotating about a second axis, said compression-moulding units positioned about said second carousel and said second axis spaced from said first axis, said means for axially aligning and axially displacing said moulding cavity is operatively arranged to axially position said moulding cavity underneath said dosing chamber along at least a portion of said first circular path; and, a means for actively cooling said plurality of compression-moulding units.

7. A device for compression moulding plastic objects comprising in combination:

a first carousel rotating about a first axis comprising a plurality of variable-volume chambers rotating about said first axis along a first circular path, said first carousel further comprising a dosing chamber positioned about said first carousel operatively arranged to fill said plurality of variable-volume chambers with a dose of plastic material as said variable-volume chambers traverse said first circular path;

a second carousel rotating about a second axis comprising a plurality of compression-moulding units positioned about said second carousel rotating substantially along a second circular path, wherein said second axis is axially distanced from said first axis and each of said compression-moulding units comprise a tube-shaped moulding cavity and a positive moulding element positioned proximately above said tube-shaped moulding cavity and operatively arranged to engage said tube-shaped moulding cavity, and said variable-volume chambers are operatively arranged to discharge said dose of plastic material into said tube-shaped moulding cavity;

a vertical displacement device operatively attached to said positive moulding element;

a means for axially aligning and axially displacing said tube-shaped moulding cavity with respect to said positive moulding element by axially positioning at least one of said tube-shaped moulding cavities out of said second circular path and axially positioning at least one of said tube-shaped moulding cavities underneath one of said variable-volume chambers along at least a portion of said first circular path for a time period long enough to allow said dose of plastic material to discharge from said variable-volume chamber and drop into said tube-shaped moulding cavity while said first and second carousels continually rotate; and, a means for actively cooling said plurality of compression-moulding units.

8. The device according to claim 7, wherein said means for axially aligning and axially displacing said tube-shaped moulding cavity is a cam-actuating mechanism adapted to displace each tube-shaped moulding cavity outside a vertical axis of the positive-mould element by means of a movement that is independent of the other tube-shaped moulding cavities.

* * * * *